US007870119B2

(12) United States Patent
Wason

(10) Patent No.: US 7,870,119 B2
(45) Date of Patent: *Jan. 11, 2011

(54) ADVANCED SCROLLING FOR RELATIONAL DATABASE APPLICATIONS

(75) Inventor: James R. Wason, Tuxedo, NY (US)

(73) Assignee: International Business Machines Corporation, Armonk, NY (US)

( * ) Notice: Subject to any disclaimer, the term of this patent is extended or adjusted under 35 U.S.C. 154(b) by 158 days.

This patent is subject to a terminal disclaimer.

(21) Appl. No.: 12/172,307

(22) Filed: Jul. 14, 2008

(65) Prior Publication Data

US 2008/0275855 A1 Nov. 6, 2008

Related U.S. Application Data

(63) Continuation of application No. 10/981,229, filed on Nov. 4, 2004, now Pat. No. 7,406,463.

(51) Int. Cl.
G06F 7/00 (2006.01)
G06F 17/30 (2006.01)

(52) U.S. Cl. ..................................... 707/706
(58) Field of Classification Search .............. 707/3, 707/7, 706
See application file for complete search history.

(56) References Cited

U.S. PATENT DOCUMENTS

| | | | |
|---|---|---|---|
| 5,551,024 A * | 8/1996 | Waters | 707/3 |
| 5,666,526 A | 9/1997 | Reiter et al. | |
| 5,793,772 A * | 8/1998 | Burke et al. | 370/508 |
| 5,812,131 A | 9/1998 | Bertram | |
| 6,647,360 B2 | 11/2003 | Graham et al. | |
| 6,721,731 B2 | 4/2004 | Cornwell et al. | |
| 2002/0054105 A1 | 5/2002 | Breuere et al. | |
| 2002/0055981 A1 | 5/2002 | Spacy et al. | |

OTHER PUBLICATIONS

IBM Technical Disclosure Bulletin, "Orderable, Updateable, Scrollable, Structured Query Language Cursors", vol. 38, No. 07, Jul. 1995.

* cited by examiner

*Primary Examiner*—Kimyen Vu
*Assistant Examiner*—Chi Nguy
(74) *Attorney, Agent, or Firm*—Scully, Scott, Murphy & Presser, P.C.; John Pivnichny

(57) ABSTRACT

Disclosed are a method, a system and a computer program for scrolling to an arbitrary position in a set of unfetched rows of data in a relational database. Each of the rows has a plurality of columns and a class value in each of the columns. Also, each column of the set of rows of data has class values for a specified data class, and the rows ore ordered in the set according to a given sequence of these classes. The method of this invention, preferably, comprises the steps of identifying one of the rows in the database, and finding that one of the rows by identifying the given sequence of data classes by which the rows are ordered in the database, and for each of the data classes in the given sequence, determining the class value for the data class in the identified one of the rows. These rows may be ordered for purposes of a query in the database. Preferably, values of the data classes in the identified one of the rows are themselves determined, one data class at a time, and in the order in which the data classes occur in the given sequence.

24 Claims, 2 Drawing Sheets

FIG. 1

| COMPANY NAME | CUSTOMER | ORDER NUMBER |
|---|---|---|
| 1 | 3 | 742 |
| 1 | 3 | 755 |
| 1 | 8 | 6 |
| 1 | 9 | 12 |
| 2 | 5 | 231 |
| 2 | 6 | 415 |
| ... | ... | ... |
| 83 | 9 | 320 |
| 83 | 8 | 450 |
| 83 | 8 | 883 |
| 83 | 10 | 179 |
| 83 | 11 | 25 |
| 83 | 12 | 37 |
| 83 | 12 | 76 |

ADVANCED SCROLLING FOR RELATIONAL DATABASE APPLICATIONS

CROSS REFERENCE TO RELATED APPLICATION

This application is a continuation application of U.S. patent application Ser. No. 10/981,229, filed Nov. 4, 2004, for "Advanced Scrolling for Relational Database Applications," now U.S. Pat. No. 7,406,463, issued Jul. 29, 2008, the disclosure of which is herein incorporated by reference in its entirety.

BACKGROUND OF THE INVENTION

1. Field of the Invention

This invention generally relates to methods and systems for scrolling through rows of data, which for example may be identified as a result of a search query. More particularly, the preferred embodiment of the invention provides a procedure and mechanism for jumping through the rows, and is very well suited for scrolling through data sets that have a very large number of rows.

2. Background Art

Presentation of data from a relational database has always been concerned with limiting the results of unbounded queries. For example, this is achieved in the Enterprise Application Development Platform (EADP) by using the ability of DB2 to limit the results returned in the result set, and then providing for scrolling forward or backward through the data.

The problem with this approach is the increasing popularity of search style results pages to display data contained in a relational database. These pages can allow jumping to, for example, page 400 of the results. If twenty rows are displayed per page, this requires jumping to row 7980 of the result set. It is not practical to process 8000 rows to determine which ones to show; however, it is not a trivial matter to determine by any other means which row is the 7980th in a result set.

SUMMARY OF THE INVENTION

An object of the present invention is to provide an advanced scrolling technique.

Another object of this invention is to provide a scrolling procedure that may be used to jump to a distant page, forwards or backwards, and that limits the number of rows held in memory at any given time.

A further object of the invention is to provide a system and method that, given a SQL query with a selection string and an order by clause, will determine which set of values of the order by columns will produce any requested row of the query.

These and other objectives are attained with a method, system and computer program for scrolling to an arbitrary position in a set of unfetched rows of data in a relational database. Each of the rows has a plurality of columns and a class value in each of the columns. Also, each column of the set of rows of data has class values for a specified data class, and the rows are ordered in the set according to a given sequence of these classes.

The method of this invention, preferably, comprises the steps of identifying one of the rows in the database, and finding that one of the rows by identifying the given sequence of data classes by which the rows are ordered in said database, and for each of the data classes in the given sequence, determining the class value for the data class in the identified one of the rows.

These rows may be ordered for purposes of a query in the database. Preferably, class values for the data classes in the identified one of the rows are themselves determined, one data class at a time, and in the order in which the data classes occur in the given sequence. These class values may be determined by iteratively testing values of a first data class in the given sequence to determine the one of the class values of said first data class that is in the identified row, and iteratively testing values of a second data class in said given sequence to determine the one of the class values of said second data class that is in the identified row.

Also, in a preferred embodiment, as a result of iteratively testing the values of the first data class, a range of rows in the data set are determined that have the one of the class values of the first data class. Once this range is determined, the values of the second data class are iteratively tested only in this range. This process can be repeated for each data class in the sequence until class values are found for all of those data classes. As a more specific, preferred example, the desired value for each of the data classes may be determined by, first, identifying maximum and minimum values for the class, and testing these values to determine if either one is the class value for the data class in the identified row. If neither of these values are the class value in that identified row, then either the minimum or maximum value may be changed to a new value, and this new value may be tested to determine if it is the class value in the identified row. This procedure can be repeated until the class value in the identified row is found.

The preferred embodiment of the invention has the following preferred features:

1. A mechanism to define the current state of a scrollable query and to save that state across Web interactions.

It may be noted that that this invention is very different from a JDBC2 scrollable result set. A scrollable query as defined herein does not require the entire result set to be determined. One of the major features of the scrollable query of the present invention is its capability to assign only a limited number of rows into the result set at any given time (using, for example, the jdbc supported facility to limit the number or rows in the result set to a predetermined maximum). This is important to achieve good performance and memory management when the raw size of the result set may be thousands or millions of rows. Additionally, since scrolling may be initiated as separate http requests, and these may potentially land on different nodes in a clustered environment (this invention does not require that all interactions land on the same node), it is important to be able to save the current state of the query between interactions, and to have this stored in a place that is accessible to all nodes in a cluster. This is possible with this invention, but not with scrollable result sets as defined using JDBC2.

The attributes that define the query are the sql statement used for selection (this may include joining several tables), the order by columns, the data for the "current" row, its row number, the rows currently available in memory, and the total number of rows for the query.

2. A mechanism to determine, given a row number, what set of values for the order by columns will give that row.

It is in fact possible to formulate a sql query that will provide this answer. The problem is that the query may take several hours to produce a result. The technique described herein finds the answer quickly and efficiently, and provides a practical way to handle scrolling over very large result sets.

Preferably, this is comprised of several steps:

a. To determine an order of precedence for determination of values for the order by columns.

If the order by clause is ORDER BY COL1, COL2, . . . COLN, the determination of values is in that order (the same order that the columns appear in the order by clause).

b. To determine which table in the query the order by column belongs to.

It was mentioned above that the selection for the scrollable query may include joining tables. However, this is not totally free form. The query has a "primary" table. Extra tables may be joined for two reasons: to add restrictions for security to limit the results of the query; and to allow sorting by columns in a subobject table. In the first case, the tables added for security will not affect the sort order, so they will not appear as order by columns. In the second case, however, the columns added for subobject sorting will of necessity appear as order by columns.

c. Given an order by column, and previously determined values for preceding order by columns, to determine the maximum value of that order by column within the constraints of the base query for the result set and the fixed values for the previously determined values of the preceding order by columns.

d. Given an order by column, and previously determined values for preceding order by columns, to determine the minimum value of that order by column within the constraints of the base query for the result set and the fixed values for the previously determined values of the preceding order by columns.

e. Given a value of order by column, and previously determined values for preceding order by columns, to determine the number of rows that satisfy the constraints of the base query, the constraints of values for the preceding order by columns equal to the previously determined values, and values for the current order by column less than or equal to the given value.

f. Given two values of an order by column, and previously determined values for preceding order by columns, to determine if there is an intermediate value of the order by column that will satisfy the constraints of the base query, and the constraints of the values for the preceeding order by columns equal to the previously determined values.

g. Given a line count, an order column and previously determined values for preceding order by columns, to determine the maximum value of that order by column within the constraints of the base query for the result set and the fixed values for the previously determined values of the preceding order by columns such that the number of rows, as described in (e) above, is less than or equal to the given line count.

h. If the ordering for that order by column is descending instead of ascending, to reverse maximum and minimum to make the appropriate determination of the value for the order by column.

i. Given a line count, a base query, and a set of order by columns, to iteratively perform the steps described above for each order by column to determine the set of values for the order by columns.

3. A mechanism to provide scrolling for a scrollable query, without ever keeping more than a predetermined limited set of rows in memory, this set being arbitrarily small compared to the total number of rows that can be fetched for the query.

Preferably, this mechanism comprises the following parts:

a. A mechanism to determine the current rows in memory, and the relative line count, in terms of the total potential rows in the query, of the first row of the current set.

b. A mechanism to determine the set of values for the order by columns that will yield the first row currently in memory.

c. A mechanism to determine the set of values for the order by columns that will yield the last row currently in memory.

d. A mechanism to create a query to find the next set of rows after the last row in memory.

e. A mechanism to create a query to find the previous set of rows before the first row in memory.

f. A mechanism, given a requested line count for a new scroll position, to determine whether the scroll is forward or backward.

g. A mechanism to determine if it is more efficient to get to the new scroll position by using a query based on the values of the rows currently in memory, or if the facilities described above should be used. This is based on the number of rows that need to be brought into memory from the current scroll position to get to the new scroll position.

h. A mechanism, given a requested line count for a new scroll position, to determine the query needed to fetch a set of rows in memory starting with the row for that line count.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 1 shows a set of rows of data of the type with which the present invention may be used.

DETAILED DESCRIPTION OF THE PREFERRED EMBODIMENTS

Figure 2:
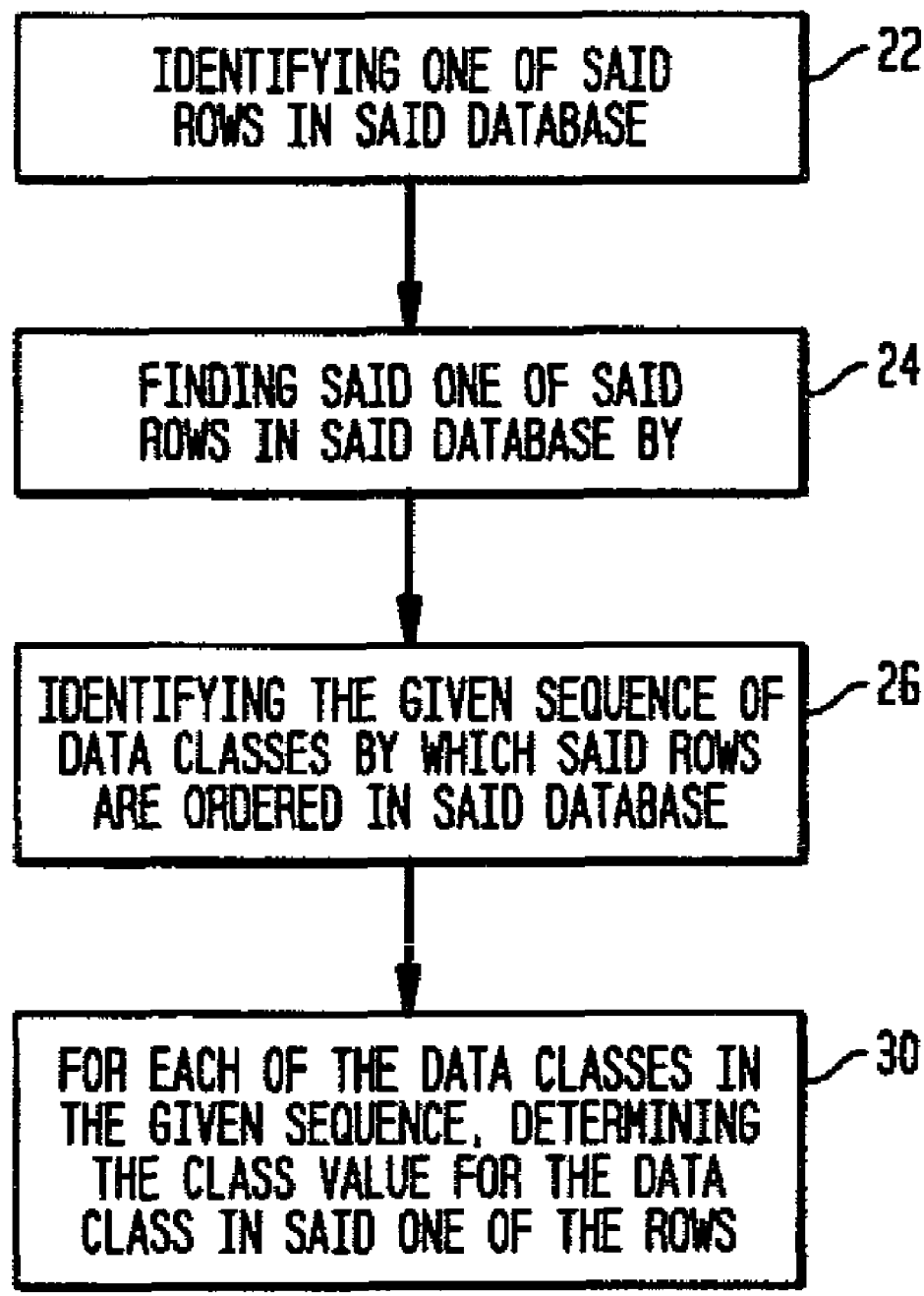
FIG. 2 is a flow chart illustrating a method that may be used to practice this invention.

The present invention provides a method, system and computer program for scrolling through rows of data and the preferred embodiment of the invention is particularly well suited for scrolling through very large sets of rows, such as sets having 10,000 or 100,000 rows. These rows may contain data found during a computer search query.

FIG. 1 illustrates a set 10 of data rows 12 with which, as an illustrative example, the invention may be used. In this set, each row has three columns 14, 16 and 20; and each column holds values for a specified class of data, identified, for example, as "company name" 14, "customer" 16 and "order number" 20. In an actual data base, it may be noted, these values are numbers, with each company having an associated company number, each customer having an associated customer number, and each order having an associated order number. The specific number of rows in this set may vary over an extremely large range, and as indicated above, the set may have 10,000, 100,000, or more rows. The rows are arranged in an order according to the columns. For instance, the rows are arranged, first, according to company name 14; then, within each company name, the rows are arranged according to customer 16; and then, for rows that have the same company and customer values, the rows are arranged according to order number 20.

With reference to FIG. 2, a preferred method embodying this invention includes the step 22 of identifying one of the rows in the data set, and the step 24 of finding that one of the rows by, as represented at 26, identifying the given sequence by which the rows are ordered in the set, and as represented at 30, by, for each of the data classes in the given sequence, identifying the value for the data class in said one of the rows. Preferably, values of the data classes in the identified one of the rows are themselves determined, one data class at a time, and in the order in which the data classes occur in the given sequence. These data values may be determined by iteratively testing values of a first data class in the given sequence to determine the one of the values of said first data class that is in the identified row, and iteratively testing values of a second data class in said given sequence to determine the one of the values of said second data class that is in the identified row.

The preferred embodiment of this invention is an enhancement to the database facilities provided by the Enterprise Application Development Platform (EADP). It uses the simple persistence mechanism and is built off of the general EADP facilities described in U.S. Pat. No. 5,832,268, and U.S. patent application Ser. No. 10/157,262, filed May 29, 2002, entitled "WEB AND LOTUS NOTES ADAPTER LAYERS"; Ser. No. 09/615,976, filed Jul. 14, 2000, entitled "COMPLEX DATA NAVIGATION, MANIPULATION AND PRESENTATION SUPPORT FOR VISUALAGE JAVA"; and Ser. No. 10/825,417, filed Apr. 13, 2004, entitled "SIMPLE PERSISTANCE MECHANISM FOR SERVER BASED WEB APPLICATIONS." The disclosures of the above-identified U.S. patent application Ser. Nos. 10/157, 262, 09/615,976 and 10/825,417 are herein incorporated by reference in their entireties.

The preferred embodiment of the invention provides several specific mechanisms. These are:

1. A mechanism to define the current state of a scrollable query and to save that state across Web interactions;

2. A mechanism to determine, given a row number, what set of values for the order by columns will give that row; and 3. A mechanism to provide scrolling for a scrollable query, without ever keeping more than a predetermined limited set of rows in memory, this set being arbitrarily small compared to the total number of rows that can be fetched for the query.

Each of these mechanisms will be discussed in detail below.

1. A mechanism to define the current state of a scrollable query and to save that state across Web interactions.

As described in the above-listed patents and patent applications, the EADPDAManager class provides mechanisms to deal with database queries. These include the ability to define a selection, to limit results, to find the total potential number of rows matching the query constraints, to set the maximum rows returned in a result set, to define sort columns to hold the returned rows in memory and to maintain state across http interactions on different nodes in a cluster. Previously described functions also includes the ability to scroll forward by determining the order by column values for the last row in memory, using those values to formulate a sql statement to find the next set of rows, executing that query, and adding the fetched rows to the rows in memory. This approach is not adequate for scrolling over very large databases.

It should be mentioned that order by columns can be user specified, but EADP always adds a unique key column to the set of order by columns to ensure that the result set is consistently ordered. Among other things, this ensures that for each line count there is a set of values for the order by columns that will point to exactly the row for that line count.

This invention enhances the scrolling facilities by allowing the rows currently in memory to "float" over the total number of potential rows. The first attribute that is added to achieve this is the line count, which indicates the relative position of the first row of the rows currently in memory in comparison to the total rows that could be fetched for the query. The second attribute is a limit on the number of rows to be held in memory at any given time.

It may also be noted that the total number of potential rows that can be fetched for the query is determined using a sql query to select the count of rows that match the query constraints (as opposed to finding the full result for the query).

2. A mechanism to determine, given a row number, what set of values for the order by columns will give that row.

It is the ability to do this that allows a scroll request to "jump" to an entirely different line count without the need to deal with the intervening rows. The algorithm described herein is an enhancement of the widely used binary search technique, using a succession of queries to determine line counts and maximum and minimum values for order by columns. In order to process these efficiently, a special instance of EADPSimpleHome is preferably used. It is defined to use a virtual table having one column, of type character. All the queries used within the process are then set up to return a result in character format.

The method described herein is the keyForLineNumber method in the EADPKeyForLineNumber class. This class has an instance of EADPDAManager as an attribute (the currentManager) and it is assumed that when this attribute has been assigned, that instance has been set up with the query string, sort columns, line number, etc. It should be noted that each instance of EADPDAManager handles queries for a particular database table. The query, however, may include joins to other tables for security (added by secureSelect) and, in the case of a document table (a manager for DataheadApplicationClass), the query may include joins to the primary subobject (Databody) to add sort columns from that subobject.

a. To determine an order of precedence for determination of values for the order by columns.

This is determined by getting the order by clause from the current manager, and then parsing out the column names. These are contained in a list of the order by columns, which is then iterated in the following steps.

b. To determine which table in the query the order by column belongs to.

The base form of the selection query is SELECT T1.COL1, T1.COL2, . . . T1.COLn FROM (tablename) T1 WERE . . . ORDER BY T1.COLx, T1.COLy . . . .

If there are subobject sort columns, the form of the query changes to:

SELECT T1.COL1, T1.COL2, . . . T1.COLn, TS0.COLa, TS1.COLb, . . . TSm.COLc FROM DATAHEAD T1, DATABODY TS0, DATAQBODY TS1, . . . DATABODY TSn WERE . . . ORDER BY T1.COLx, T1.COLy, n+1, n+2, n+m.

The subobject sort columns are represented by number instead of name. Of course, for processing in this method, the column name needs to be found. This is done by reading the selection string up to TS0. If TS0 occurs within the string, the subobject sort columns (up to FROM) are parsed and their names are used to replace the numeric names found in the step above when the list of sort by columns was derived.

c. Given an order by column, and previously determined values for preceding order by columns, to determine the maximum value of that order by column within the constraints of the base query for the result set and the fixed values for the previously determined values of the preceding order by columns.

Here the base query is the WHERE clause in the selection described above. This may include a user entered query to limit selection, table joins for security purposes, and table joins for the subobject sort columns. At each stage of iteration through the sort columns, this query is enhanced to limit selection to the previously defined values of the order by columns. This iteratively enhanced query will be referred to hereafter as the "current query". The current query string is built up at each stage (adding the value for COLm) as follows:

currentQuery="("+currentQuery+"(COLm=COLm value))". The value for COLm may need to be enclosed in single quotes, depending on its sql type. The EADPDAManager provides a convenience method sqlSub to determine this, and this is used here.

The selection for the maximum value of the sort column COLn is now given by:

SELECT CHAR(MAX(COLn)) FROM . . . WHERE (currentQuery). The tables in the FROM clause are the same as in the base query. Note that the value is always cast to character so that the same instance of EADPSimpleHome can be used for all the queries used here.

d. Given an order by column, and previously determined values for preceding order by columns, to determine the minimum value of that order by column within the constraints of the base query for the result set and the fixed values for the previously determined values of the preceding order by columns.

The procedure is the same as described above except that the query is:

SELECT CHAR(MIN(COLn)) FROM . . . WHERE (currentQuery).

e. Given a value of order by column, and previously determined values for preceding order by columns, to determine the number of rows that satisfy the constraints of the base query, the constraints of value for the preceding order by columns equal to the previously determined values, and values for the current order by columns less than or equal to the given value.

The query used here (for COLn) is:

SELECT CHAR(COUNT(*)) FROM . . . WHERE((currentQuery) AND COLn<=COLn value)).

f. Given two values of an order by column, and previously determined values for preceding order by columns, to determine if there is an intermediate value of the order by column that will satisfy the constraints of the base query along with the constraints of values for the preceding order by columns equal to the previously determined values.

As was mentioned above, the overall process is similar to a standard binary search. A standard binary search consists of iteratively determining intermediate maxima and minima that bracket the desired value, and then "splitting the difference" to determine a new value that will become the next intermediate minimum or maximum. The main point of difficulty in the extension of binary search described here is "splitting the difference" between the intermediate minima and maxima. This is preferably done as follows:

i. The two values are presented in string format (as are all values retrieved from the database by these queries). The strings are converted into a character array (this bypasses any locale specific encoding scheme). The entries of the character array are compared until the first mismatch. The candidate middle value is determined by averaging the integer values, turning this back into character, and appending this to the substring consisting of the matching values up to that point.

There are some exception conditions. If the mismatch values are only one apart (as integers) averaging will not work—in this case, the high value is just truncated at that point to give the new average.

ii. What results is a proposed value for the new average. The next step is to determine if there is a nearby value on the database. To do this, the average value needs to be acceptable as input in a sql query. If the type is numeric, the proposed average is left padded with 0's to a length of 12 (to ensure that numeric comparison is used). This is also done to the two values used as the high and low before the new average is determined. If the sql type is timestamp, the proposed average is right padded with the part of 0000-01-01-00.0000.000000 to the right of the truncated string to ensure that it is processed as a valid timestamp value.

iii. The next step is to find the nearest column value to the new proposed average. The first substep of this step is to find the minimum value greater than or equal to the proposed average. If this is equal to the current maximum, the next substep is to find the maximum value less than the proposed average.

g. Given a specified line count, an order by column and previously determined values for preceding order by columns, to determine the maximum value of that order by column within the constraints of the base query for the result set and the fixed values for the previously determined values of the preceding order by columns such that the number of rows, as described in 2(e) above, is less than or equal to the given line count.

This process uses the steps described above. The maximum and minimum values for the sort column are determined as described in 2(c) and 2(d), and the line counts associated to each are determined as described in 2(e). If the specified line count is equal to either of these values, or falls outside them, the process terminates at this point.

The average of the maximum and minimum is determined as in step 2(f). If this average is equal to either the maximum or minimum the process terminates. The line count for the average is determined as described in 2(e). If it is less than the specified line count, the average becomes the new minimum. Otherwise it becomes the new maximum.

It may be noted that the point of termination occurs when there is no value in between the current maximum and minimum. This means that the current minimum is the largest value of the order by column with line count less than or equal to the specified line count.

h. If the ordering for that order by column is descending instead of ascending, to reverse maximum and minimum to make the appropriate determination of the value for the order by column.

All the steps described above have assumed that the sort order for the order by column is ascending. If it is descending, the queries described above use MIN instead of MAX and >= instead of <=.

i. Given a line count, a base query, and a set of order by columns, to iteratively perform the steps described above for each order by column to determine the set of values for the order by columns.

A list of the order by columns is prepared, using the sequencing described in 2(a) and finding the real column name as described in 2(b). There is also a list prepared of whether the ordering for that column is ascending or descending. This is used at each stage as described in 2(h). An initial line count is passed in to the method. For each order by column, the best value for that column is determined as described in 2(g). That process finds the maximum value of the order by column (or minimum as per 2(h)) with a line count less than the line count passed in (call this the iteration line count). The iteration line count is then subtracted from the passed in line count, and the remainder is passed as the specified line count to the next stage of the iteration.

The result of this process is a list of values for the order by columns. These values can then be used to formulate a query that will yield the row in the position of the original line count passed into the process.

3. A mechanism to provide scrolling for a scrollable query, without ever keeping more than a predetermined limited set of rows in memory, this set being arbitrarily small compared to the total number of rows that can be fetched for the query.

As was mentioned above, an attribute is preferably added to EADPDAManager for the preferred embodiment of this invention to limit the total rows in memory. The default for this is 200 (as opposed to the default for the maximum number of rows fetched at one time).

a. A mechanism to determine the current rows in memory, and the relative line count, in terms of the total potential rows in the query, of the first row of the current set.

The rows currently in memory are held in the items attribute of the EADPDAManager. The lineCount attribute described above gives the relative position of the first row in the items list.

b. A mechanism to determine the set of values for the order by columns that will yield the first row currently in memory.

This is done by evaluating the values of the order by columns against the first row in the items list.

c. A mechanism to determine the set of values for the order by columns that will yield the last row currently in memory.

This is done by evaluating the values of the order by columns against the last row in the items list.

d. A mechanism to create a query to find the next set of rows after the last row in memory.

The structure of the base query for a scrollable query is
SELECT (column names) FROM (table names) WHERE (base selection) ORDER BY (OrderByCol1 asc/desc, . . . OrderByColn asc/desc).

To find the next set of rows after the last row in memory, the first step is to find a list of values for the order by columns as described in 3(c). Call these OrderByVal1, . . . OrderByValn. An extra predicate to the where clause is then built up by requiring that the rows have value of the first order by column greater than (or less than) the OrderByVal1, or value for that column equal to OrderByVal1, and value for OrderByCol2 less than OrderByVal2, etc. This can be formally described as OrderByPred=OrderByPred1+OrderByPred2+ . . . +OrderByPredn where OrderByPredn=OrderEqPred(n−1)+"OrderByColn>/<OrderByValn". Here OrderEqPred0 is a null string, an OrderEqPredn=OrderEqPred(n−1)+ "OrderByColn=OrderByValn". The ">/<" is > if the sort order for that column is ascending, and < if the sort order is descending. It should also be understood that some of the values of the order by columns may need to be enclosed in single quotes, depending on the sql type, when included in the query. As before, this is handled by the sqlSub method on the EADPDAManager.

The revised query to find the next set of rows is now of the form
SELECT (column names) FROM (table names) WHERE ((base selection) AND OrderByPred) ORDER BY (OrderByCol1 asc/desc, . . . OrderByColn asc/desc).

There is a slight variation of the processing to produce this query when the base selection string is empty. In this case, the query is of the form
SELECT (column names) FROM (table names) WHERE (OrderByPred) ORDER BY (OrderByCol1 asc/desc, . . . OrderByColn asc/desc).

e. A mechanism to create a query to find the previous set of rows before the first row in memory.

The process is similar to that described in 3(d) with the following exceptions:

OrderByValn is based on the value of OrderByColn in the first row as described in 3(b).

The ">/<" condition in OrderByPredn is reversed.

In the query to fetch the additional rows, each order by column has its sort order reversed (asc becomes desc and desc becomes asc). The rows are thus the rows preceding the first row, fetched in reverse order. Each of these additional rows is added as the first row of items (so when they are all added, the ordering is back to the original one, with the additional rows preceding the ones that were already in memory).

f. A mechanism, given a requested line count for a new scroll position, to determine whether the scroll is forward or backward.

This is done by comparing the requested line count to the current line count. If it is less than the current line count, it is a backward scroll.

g. A mechanism to determine if it is more efficient to get to the new scroll position by using a query based on the values of the rows currently in memory, or if the facilities described above should be used. This is based on the number of rows that need to be brought into memory from the current scroll position to get to the new scroll position.

If the difference between the requested line count and the current line count is greater than the maximum rows to be held in memory, the facilities of 2(i) are used to find the values that will get the row for the requested line count. Otherwise, rows are added to the items list (forward or backward as determined in 2(f)) using the queries described in 3(d) or 3(e) to fill in enough rows to get to the requested line count.

h. A mechanism, given a requested line count for a new scroll position, to determine the query needed to fetch a set of rows in memory starting with the row for that line count.

The process is similar to that described in 3(d), except that the values for OrderByValn are derived as described in 2(l), given the line count. The query is used to fetch the next set of rows including that line count.

As indicated hereinabove, it should be understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized.

The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art and it is intended that the appended claims cover all such modifications and embodiments as fall within the true spirit and scope of the present invention.

What is claimed is:

1. A search system for identifying, in response to a base query, values in a selected row in a set of unfetched rows of data in a relational database comprised of a multitude of rows and a plurality of columns, each of the columns being associated with a respective one data class, and each of said plurality of columns of each row of the database having a value for the data class associated with the column, and said rows of the database are arranged in said database in a sequential order according to a given sequence of said data classes, the search system comprising a computer system including instructions for:

identifying a row number for one of said rows in said database;

determining values for the data classes in the row at said row number, using said row number by identifying the given sequence of data classes according to which said rows of the database are arranged in said sequential order in said database, and for each of the data classes in the given sequence, determining the value for the data class in the row at said row number, including:

i) determining an order of precedence of the columns in the row at said row number, ii) for the first column in said order of precedence, determining the value for the data class associated with said first column from said row number and said base query, and iii) for the data class associated with each subsequent column in said order of precedence after said first column, (1) determining a maximum value and a minimum value for the data class from said base query and each value determined for each data class associated with each column previous to said each subsequent column in said order of precedence, and (2) determining a row value for the data class from said base query and said maximum and minimum values.

2. The search system according to claim 1, wherein:

determining values for the data classes includes determining, for each of the data classes in said given sequence, said values for the data classes in the row at said row number, one data class at a time, and in the order in which said data classes occur in said given sequence.

3. The search system according to claim 2, wherein determining values for the data classes in the row at said row number, one data class at a time, includes:

iteratively testing values of a first data class in said given sequence to determine the one of the values for said first data class that is in the row at said row number; and iteratively testing values of a second data class in said given sequence to determine the one of the values for said second data class that is in the row at said row number.

4. The search system according to claim 3, wherein:

the iteratively testing values of a first data class includes determining a range of rows, in said set of rows, having said one of the values for said first data class; and the iteratively testing values of a second data class includes testing values of the second data class only in said range of rows.

5. The search system according to claim 1, wherein, the determining values for the data classes includes:

testing, for each of the data classes, to determine if the maximum value for the data class is the value for the data class in said one of said rows, and to determine if said minimum value for the data class is the value for the data class in said one of said rows.

6. The search system according to claim 5, wherein the determining values for the data classes further includes:

changing one of said maximum and minimum values to a new value if neither said maximum value nor said minimum value is the value for the data class in said one of said rows, and for testing to determine if said new value is the value for the data class in said one of said rows.

7. A tangible program storage device including a memory readable by machine computer and tangibly embodying a program of instructions executable by the computer machine to perform method steps for identifying values in a selected row in a set of unfetched rows of data in a relational database comprised of a multitude of rows and a plurality of columns, each of the columns being associated with a respective one data class, and each of said plurality of columns of each row of the database having a value for the data class associated with the column, and wherein said rows of the database are arranged in said database in a sequential order according to a given sequence of said data classes, and wherein said program of instructions, when executed in the computer, performs the following:

identifying a row number for one of said rows in said database; and determining values for the data classes in the row at said row number, using said row number, by identifying the given sequence of data classes according to which said rows of the database are arranged in said sequential order in said database, and for each of the data classes in the given sequence, determining the class value for the data class in the row at said row number, including the steps of:

i) determining an order of precedence of the columns in the row at said row number, ii) for the first column in said order of precedence, determining the value for the data class associated with said first column from said row number and said base query, and iii) for the data class associated with each subsequent column in said order of precedence after said first column, (1) determining a maximum value and a minimum value for the data class from said base query and each value determined for each data class associated with each column previous to said each subsequent column in said order of precedence, and (2) determining a row value for the data class from said base query and said maximum and minimum values.

8. The tangible program storage device according to claim 7, wherein: the step of, for each of the data classes in said given sequence, determining said value for the data class in the row at said row number includes the step of determining the values for the data classes in the row at said row number, one data class at a time, and in the order in which said data classes occur in said given sequence.

9. The tangible program storage device according to claim 8, wherein the step of determining the values for the data classes in said row at row number, one data class at a time, includes the steps of:

iteratively testing values of a first data class in said given sequence to determine the one of the values for said first data class that is in the row at said row number; and iteratively testing values of a second data class in said given sequence to determine the one of the values for said second data class that is in the row at said row number.

10. The tangible program storage device according to claim 9, wherein: the step of iteratively testing values of a first data class includes the step of determining a range of rows, in said database, having said one of the values for said first data class; and the step of iteratively testing values of a second data class includes the step of testing values of the second data class only in said range of rows.

11. The tangible program storage device according to claim 7, wherein the step of, for each of the data classes in the given sequence, determining the value for the data class in said one of said rows, includes the steps of:

testing to determine if said maximum value is the value for the data class in said one of said rows; and testing to determine if said minimum value is the value for the data class in said one of said rows.

12. The tangible program storage device according to claim 11, wherein the step of, for each of the data classes in the given sequence, determining the value for the data class in said one of said rows, comprises the further steps of:
if neither said maximum value nor said minimum value are the value for the data class in said one of said rows, then changing one of said maximum and minimum values to a new value; and
testing to determine if said new value is the value for the data class in said one of said rows.

13. A method of identifying, in response to a base query, values in a selected row in a set of unfetched rows of data in a scrollable database query, said database comprised of a multitude of rows and a plurality of columns, each of the columns being associated with a respective one data class, and each of said plurality of columns of each row of the database having a value for the data class associated with the column, and wherein said rows of the database are arranged in said database in a sequential order according to a given sequence of said data classes, the method comprising the steps of:
identifying a row number for one of said rows in said database; and
determining values for the data classes in the row at said row number, using said row number, by identifying the given sequence of data classes according to which said rows of the database are arranged in said sequential order in said database, and for each of the data classes in the given sequence, determining the value for the data class in the row at said row number, including the steps of
i) determining an order of precedence of the columns in the row at said row number,
ii) for the first column in said order of precedence, determining the value for the data class associated with said first column from said row number and said base query, and
iii) for the data class associated with each subsequent column in said order of precedence after said first column, (1) determining a maximum value and a minimum value for the data class from said base query and each value determined for each data class associated with each column previous to said each subsequent column in said order of precedence, and (2) determining a row value for the data class from said base query and said maximum and minimum values;
presenting said determined values of said identified row in the database without processing or computing all of the intervening rows; and
using a computer system, including one or more processing units executing a value determination program, to perform the determining values for the data classes in the row at said row number.

14. The method according to claim 13, wherein:
the step of, for each of the data classes in said given sequence, determining said value for the data class in the row at said row number includes the step of
determining values for the data classes in the row at said row number, one data class at a time, and in the order in which said data classes occur in said given sequence.

15. The method according to claim 14, wherein the step of determining values for the data classes in the row at said row number, one data class at a time, includes the steps of:
iteratively testing values of a first data class in said given sequence to determine the one of the values of said first data class that is in said one of said rows; and
iteratively testing values of a second data class in said given sequence to determine the one of the values of said second data class that is in the row at said row number.

16. The method according to claim 15, wherein:
the step of iteratively testing values of a first data class includes the step of determining a range of rows, in said database, having said one of the values for said first data class; and
the step of iteratively testing values of a second data class includes the step of testing values of the second data class only in said range of rows.

17. The method according to claim 13, wherein the step of, for each of the data classes in the given sequence, determining the value for the data class in said one of said rows, includes the steps of:
testing to determine if said maximum value is the value for the data class in said one of said rows; and
testing to determine if said minimum value is the value for the data class in said one of said rows.

18. The method according to claim 17, wherein the step of, for each of the data classes in the given sequence, determining the value for the data class in said one of said rows, comprises the further steps of:
if neither said maximum value nor said minimum value is the value for the data class in said one of said rows, then changing one of said maximum and minimum values to a new value; and
testing to determine if said new value is the value for the data class in said one of said rows.

19. A method of deploying a computer program product for identifying, in response to a base query, values in a selected row in a set of unfetched rows of data in a scrollable database query, said relational database comprised of a multitude of rows and a plurality of columns, each of the columns being associated with a respective one data class, and each of said plurality of columns of each row of the database having a value for the data class associated with the column, and wherein said rows of the database are arranged in said database in a sequential order according to a given sequence of said data classes, the method comprising:
loading, the computer program product in a computer system including one or more processing units; and
executing the computer program product in the computer system to perform the steps of:
identifying a row number for one of said rows in said database; and
determining values for the data classes in the row at said row number, using said row number by identifying the given sequence of data classes according to which said rows of the database are arranged in said sequential order in said set database, and for each of the data classes in the given sequence, determining the value for the data class in the row at said row number, including the steps of:
i) determining an order of precedence of the columns in the row at said row number,
ii) for the first column in said order of precedence, determining the value for the data class associated with said first column from said row number and said base query, and
iii) for the data class associated with each subsequent column in said order of precedence after said first column, (1) determining a maximum value and a minimum value for the data class from said base query and each value determined for each data class associated with each column previous to said each subsequent column in said order of precedence, and (2) determining a row value for the data class from said base query and said maximum and minimum values.

20. The method according to claim 19, wherein:
the step of, for each of the data classes in said given sequence, determining said value for the data class in the row at said row number includes the step of:
determining the values for the data classes in the row at said row number, one data class at a time, and in the order in which said data classes occur in said given sequence.

21. The method according to claim 20, wherein the step of determining values for the data classes in the row at said row number, one data class at a time, includes the steps of:
iteratively testing values of a first data class in said given sequence to determine the one of the values for said first data class that is in the row at said row number, and
iteratively testing values of a second data class in said given sequence to determine the one of the values for said second data class that is in the row at said row number.

22. The method according to claim 21, wherein:
the step of iteratively testing values of a first data class includes the step of determining a range of rows, in said database, having said one of the values for said first data class; and
the step of iteratively testing values of a second data class includes the step of testing values of the second data class only in said range of rows.

23. The method according to claim 19, wherein the step of, for each of the data classes in the given sequence, determining the value for the data class in said one of said rows, includes the steps of:
testing to determine if said maximum value is the value for the data class in said one of said rows; and
testing to determine if said minimum value is the value for the data class in said one of said rows.

24. The method according to claim 23, wherein the step of, for each of the data classes in the given sequence, determining the value for the data class in said one of said rows, comprises the further steps of:
if neither said maximum value nor said minimum value is the value for the data class in said one of said rows, then changing one of said maximum and minimum values to a new value; and
testing to determine if said new value is the value for the data class in said one of said rows.

* * * * *